Patented Dec. 19, 1944

2,365,265

UNITED STATES PATENT OFFICE 2,365,265

INSOLUBLE AZO DYES

Peter F. Gross, Woodstown, N. J., assignor to E. I. du Pont de Nemours & Company, Wilmington, Del., a corporation of Delaware No Drawing. Application August 30, 1941, Serial No. 409,002

9 Claims. (Cl. 260—156)

This invention relates to new insoluble azo dyes, to dyeings produced with the dyes and to processes of manufacturing the same, and especially to dyes which are represented by the formula $$C_5H_4N-CONH-Ph-N=N-A$$

wherein $C_5H_4-$ is the residue of pyridine, $-Ph-$ is the residue of a phenylene group which is devoid of water solubilizing groups but may be substituted by other groups, and A is the residue of an ice color coupling component.

Heretofore it has been proposed to provide blue dyes of somewhat similar structure in which a furoyl- or thenoyl-phenylene-diamine was diazotized and coupled with an arylide of beta hydroxy naphthoic acid. However, these furoyl and thenoyl dyes were not entirely satisfactory in that their light fastness, resistance to chlorine and dischargeability were not as good as were required in high standards of dyeing. It was desirable to provide new dyes in blue and other shades which had better characteristics in the respects referred to.

It is among the objects of the present invention to provide new insoluble azo dyes which are represented in general by the formula $C_5H_4N-CONH-Ph-N=N-A$ in which the symbols have the significance hereinabove described. Another object of the invention is to provide dyes in shades of blue to red which have satisfactory dischargeability and fastness to light and chlorine. Other objects of the invention will be apparent from the following description.

The objects of the invention are attained by first providing primary arylamines which are represented by the formula $$C_5H_4N-CONH-Ph-NH_2$$

wherein $C_5H_4N-CO-$ is the residue of a pyridine carboxylic acid and $-HN-Ph-NH_2$ is the residue of a phenylene-diamine which is devoid of free carboxy and sulfonic acid groups but which can be substituted by other groups which do not produce water solubility. This pyridine-carbonyl diphenylamine is then diazotized and coupled by suitable means with an ice color coupling component to form a dyeing on dyeable fibrous material or a pigment, as the case may be.

The invention will be more fully set forth in the following more detailed description which includes examples that are given as illustrative embodiments of the invention and not as limitations thereof. Parts are expressed in parts by weight unless otherwise noted.

EXAMPLE 1

(a) *Preparation of 4-picolinylamino-2,5-diethoxy-nitro-benzene*

A mixture of 123 parts picolinic acid, 113 parts of 4-nitro-2,5-diethoxy-aniline, 121 parts dimethyl-aniline and 1200 parts toluene was heated to 80° C. Then 55 parts of phosphorus-trichloride was added over a period of 20–30 minutes. The temperature was held at 80°–90° C. for one hour and was then raised to the boiling point of the mixture where it was held for 12 hours longer. When the reaction was completed, steam was blown into the mixture until all steam-volatile material had been distilled off. The residue was filtered and the solid product was washed thoroughly with hot water and dried. There was obtained 114 parts of crude product. The crude product was purified by recrystallization from the ethyl ether of ethylene glycol, yielding 4-picolinyl-amino-2,5-diethoxy-nitro-benzene which was a bright yellow crystalline material melting at 172° C.

(b) *Preparation of 4-picolinylamino-2,5-diethoxy-aniline*

A mixture of 122 parts of 4-picolinylamino-2,5-diethoxy-nitro-benzene, 6 parts reduced nickel catalyst, and 375 parts toluene was placed in a closed autoclave and heated at 100° C. under a pressure of hydrogen at 400–500 pounds gauge. When absorption of hydrogen was completed, the hot solution was filtered to remove the catalyst and a yield of 70 parts of product crystallized out as a dark yellow solid upon cooling the filtrate. This was filtered off and dried. An additional 30 parts of product was then recovered from the filtrate by extraction with dilute acid and precipitating with ammonia. After purification by recrystallizing from the ethyl ether of ethylene glycol, the crystalline product of 4-picolinylamino-2,5-diethoxy-aniline was a yellow crystalline material melting at 113° C.

EXAMPLE 2

*Preparation of 4-picolinylamino-2,5-dimethoxy aniline*

A mixture of 72.5 parts of sodium picolinate, 85 parts of 2,5-dimethoxy-aniline and 400 parts of toluene was treated with 34 parts of phosphorus tri-chloride. The temperature was raised to the boiling point and the mixture refluxed for 3 hours. The toluene was removed by steam distillation. The residue was cooled, the condensation product was separated from the water and dissolved in 300 parts of toluene. The toluene solution was added slowly to 420 parts of 15% nitric acid. The mixture was held at 50°–60° C. with good agitation during the addition and it was then heated to and held at 75° C. for 15 to 20 minutes. The toluene was then removed by distillation and the solid product was filtered off, washed with methyl alcohol and dried, giving 136 parts of the nitro compound.

The nitro compound was placed in an autoclave together with 600 parts of toluene, 3 parts of calcium carbonate and 13 parts of reduced nickel catalyst. The mixture was heated at 100° C. and under a pressure of hydrogen of 400–500 pounds gauge until hydrogenation was completed. The catalyst was removed by filtering the hot mixture and the toluene solution was concentrated at atmospheric pressure to a volume of 200–400 parts. The crystalline product of 4-picolinylamino-2,5-dimethoxy-aniline was filtered off, washed with methyl alcohol and dried, yielding 106 parts of the product.

EXAMPLE 3

(a) *Preparation of 2-nitro-4-methoxy-5-picolinylamino-toluene*

A mixture of 72.5 parts of sodium picolinate, 75 parts of cresidine, 400 parts toluene and 34 parts phosphorus tri-chloride was refluxed for 3 hours. The toluene was removed by steam distillation and the residue was filtered and dried, giving 125 parts of condensation product. This was dissolved in 300 parts of toluene and the solution was filtered from a small amount of insoluble impurity. The solution was then run slowly into 420 parts of 15% nitric acid. Vigorous agitation was maintained, and the temperature was held at the boiling point of the mixture (80°–85° C.) during the addition and then for 45 minutes more. Thereafter the toluene was removed by steam distillation but the material appeared not to be completely nitrated. The material was separated from the water layer, and redissolved in 300 parts toluene. This solution was run as before at the boil into 310 parts of 20% nitric acid. The mixture was cooled, filtered and dried, yielding 58 parts of 2-nitro-4-methoxy-5-picolinylamino toluene which was a crystalline product.

(b) *Preparation of 2-amino-4-methoxy-5-picolinylamino-toluene*

A mixture of 58 parts of 2-nitro-4-methoxy-5-picolinylamino-toluene, 6 parts reduced nickel catalyst, 2 parts of calcium carbonate and 600 parts of toluene was placed in an autoclave and heated at 100° C. under a pressure of hydrogen of 400–500 pounds gauge until hydrogenation was completed. The catalyst was removed from the hot mixture by filtration. The solution was concentrated by evaporation to a volume of about 100 parts, cooled and filtered, giving 38.5 parts of yellow crystalline 2-amino-4-methoxy-5-picolinyl-amino-toluene. An additional amount of less pure material was recovered from the filtrate by extraction with hydrochloric acid.

EXAMPLE 4

(a) *Preparation of 4-nicotinylamino-2,5-diethoxy-nitrobenzene*

A mixture of 45.2 parts of 4-nitro-2,5-diethoxy-aniline, 42 parts nicotinyl chloride, and 80 parts pyridine was heated at 95°–100° for 2 hours and then poured into 600 parts of cold water. After standing overnight, the crystalline product, a bright yellow material, was filtered and washed with water until the odor of pyridine could no longer be detected, and then dried. A yield of 64 parts of 4-nicotinylamino-2,5-diethoxy-nitrobenzene having a melting point of 127° C. was obtained.

(b) *Preparation of 4-nicotinylamino-2,5-diethoxy-aniline*

A mixture of 16.6 parts of 4-nicotinylamino-2,5-diethoxy-nitro-benzene, 150 parts methyl alcohol and 5 parts of reduced nickel catalyst was placed in a closed autoclave and heated at 100° C. under a pressure of hydrogen of 400–500 pounds gauge. After the absorption of hydrogen was completed, the mixture was removed from the autoclave and filtered while still hot. The filtrate was evaporated to yield the light-colored crystalline product consisting of 4-nicotinyl-amino-2,5-diethoxy-aniline.

EXAMPLE 5

(a) *Preparation of 4-iso-nicotinylamino-2,5-diethoxy-nitro-benzene*

A mixture of 15 parts of 4-nitro-2,5-diethoxy-aniline, 14 parts iso-nicotinyl-chloride and 30 parts pyridine was heated for 5 hours at 95° C. to 100° C. under reflux. The reaction mixture was poured into 300 parts water and the solid product was filtered, washed free from pyridine with water, and dried. A yield of 21.5 parts of crude 4-iso-nicotinyl-amino-2,5-diethoxy-nitro-benzene was obtained. This was freed from contamination with unreacted 4-nitro-2,5-diethoxy-aniline by treatment with nitrous acid sufficient to completely diazotize the unreacted amino body; filtering and washing free from diazo and from acid.

The product is represented by the formula:

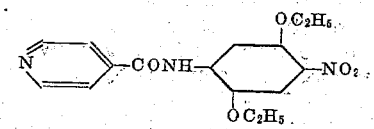

(b) *Preparation of 4-iso-nicotinyl-amino-2,5-diethoxy-aniline*

A mixture of 10 parts of 4-iso-nicotinyl-amino-2,5-diethoxy-nitro-benzene, 100 parts of methyl alcohol and 2 parts of reduced nickel catalyst was placed in a closed autoclave and heated at 100° C. under a pressure of hydrogen of 400–500 pounds gauge. After the absorption of hydrogen was complete, the mixture was filtered hot to remove spent catalyst. The filtrate was evaporated to yield the crystalline 4-iso-nicotinylamino-2,5-diethoxy-aniline.

EXAMPLE 6

(a) *Preparation of 3-picolinylamino-nitro-benzene*

A mixture of 75 parts sodium picolinate, 69 parts m-nitroaniline and 1000 parts toluene was heated to 70° C. Then 34.2 parts of phosphorus tri-chloride was added over a period of 10 to 15 minutes, and the temperature was raised to the boiling point and held there for 8 hours. The toluene was then removed by steam distillation and the crude product was filtered off from the residue. This product still contained unreacted m-nitraniline, which was removed by treatment of an aqueous slurry of the material with hydrochloric acid and sodium nitrite, filtering, and washing free from acid and diazotized m-nitraniline. The dried product consisted of 75 parts of 3-picolinylamino-nitro-benzene having a melting point of 167° C.

(b) *Preparation of 3-picolinylamino-aniline*

A mixture of 60.8 parts of 3-picolinylamino-nitrobenzene, 300 parts of methyl alcohol and 6 parts of reduced nickel catalyst was placed in an autoclave and heated at 100° C. under a pressure of hydrogen of 400–500 pounds gauge until the absorption of hydrogen was completed. The charge was then removed from the autoclave and filtered hot to remove the catalyst. The filtrate was evaporated to dryness, giving a yield of 49 parts of 3-picolinylamino-aniline containing 19.7% nitrogen. The theoretical content of nitrogen in 3-picolinylamino-aniline is 19.72%.

EXAMPLE 7

(a) *Preparation of 4-picolinylamino-3-chloronitrobenzene*

A mixture of 75 parts of sodium picolinate, 89 parts of 2-chloro-4-nitro-aniline and 1000 parts toluene was heated to 70° C. and 34.2 parts of phosphorus tri-chloride was added over a period of 10–15 minutes. The mixture was then heated to the boiling point. After refluxing for 8 hours, the toluene was removed by distillation with steam. The residue was cooled and filtered, and the crude product was dried and recrystallized from the ethyl ether of ethylene glycol, washed thoroughly and dried. The purified product consisted of 70 parts of 4-picolinylamino-3-chloro-nitro-benzene having a melting point of 236° C.

(b) *Preparation of 4-picolinylamino-3-chloroaniline*

A mixture of 55.4 parts of 4-picolinylamino-3-chloro-nitrobenzene, 350 parts of methyl alcohol and 5 parts reduced nickel catalyst was heated in an autoclave at 100° C. under a pressure of hydrogen of 400–500 pounds pressure until the hydrogenation was completed. The charge was filtered hot to remove the catalyst and the filtrate was evaporated to dryness, giving 36.5 parts of 4-picolinylamino-3-chloro-aniline analyzing 16.63% nitrogen and 14.63% chlorine. The theoretical content of nitrogen and chlorine in this product is 16.97% nitrogen and 14.34% chlorine.

EXAMPLE 8

(a) *Preparation of 2-picolinylamino-4-nitrotoluene*

A mixture of 75 parts of sodium picolinate, 63 parts of 4-nitro-2-amino-toluene and 1000 parts toluene was warmed to 70° C. and 28 parts phosphorus tri-chloride were added to the mixture over a period of 10–15 minutes. After the mixture had been heated to the boiling point and refluxed for 8 hours, the toluene was distilled out with steam and the residue was cooled, filtered off and dried, giving 89 parts of crude product. This product was purified by recrystallizing from toluene. The purified product consisting of 2-picolinyl-amino-4-nitro-toluene melted at 182°.

(b) *Preparation of 2-picolinylamino-4-aminotoluene*

A mixture of 46.3 parts of 2-picolinyl-amino-4-nitro-toluene, 4 parts nickel catalyst and 200 parts methyl alcohol was hydrogenated in a closed autoclave at 100° C. under a pressure of hydrogen of 400–500 pounds gauge until the nitro was reduced to amino. The catalyst was removed by filtering the hot solution and the filtrate was evaporated to a volume of about 60 parts, cooled, and filtered. The crystalline product consisting of 2-picolinylamino-4-aminotoluene weighed 33.5 parts when dry. Its melting point was 145° C. and it contained 18.25% nitrogen. The theoretical content of nitrogen in $C_{13}H_{13}ON_3$ is 18.51%.

EXAMPLE 9

(a) *Preparation of 2-picolinylamino-5-nitroanisole*

A mixture of 75 parts of sodium picolinate, 84 parts 5-nitro-2-amino-anisole and 1000 parts toluene was warmed to 70° C. and 34.2 parts of phosphorus tri-chloride was added over a period of 10 to 15 minutes. After heating the mixture to boiling and refluxing for 8 hours, the toluene was distilled out with steam and the residue was cooled, filtered and dried, yielding 105 parts of crude product. The crude product was purified by recrystallization successively from the ethyl ether of ethylene glycol, toluene, and ethyl alcohol. The purified product consisting of 2-picolinylamino-5-nitro-anisole melted at 209° C. and contained 15.00% nitrogen, 56.81% carbon and 4.35% hydrogen. The theoretical content of nitrogen, carbon and hydrogen in $C_{13}H_{11}O_4N_3$ is 15.38% N, 57.14% C, and 4.07% H.

(b) *Preparation of 2-picolinylamino-5-aminoanisole*

A mixture of 20 parts of 2-picolinylamino-5-nitro-anisole, 2 parts reduced nickel catalyst and 200 parts methyl alcohol was placed in a closed autoclave and heated at 100° under a pressure of hydrogen of 500–600 pounds gauge. The catalyst was removed by filtering the hot solution. The filtrate was evaporated to a volume of about 60 parts and cooled. A crystalline product consisting of 8 parts of 2-picolinylamino-5-amino-anisole and melting at 134° C. was filtered off and dried. An additional quantity of less pure material was recovered from the filtrate.

EXAMPLE 10

A piece of cotton goods, impregnated in the usual manner with N-(2'-hydroxy-3'-naphthoyl)-aniline, was developed by applying a diazo bath which was prepared as follows:

One hundred parts of 4-picolinylamino-2,5-diethoxy aniline was stirred into 300 parts of water at 115° F. Then 97 parts of hydrochloric acid (32° Tw.) was added and mixed in thoroughly. Water and ice sufficient to bring the volume to 4000 parts and the temperature to 50° F. were added, followed by a solution containing 23.2 parts of sodium nitrite added over a period of 5 to 10 minutes. The diazo solution was allowed to stand for 30 minutes at 50–55° F., diluted to a volume of 30,000 parts and then buffered by adding 346 parts of sodium acetate.

When the development of the color was complete, the piece was rinsed, soaped at the boil, rinsed again and dried. A bright blue dyeing, having very good fastness to light, washing, chlorine and power laundry was obtained.

The dye is represented by the formula

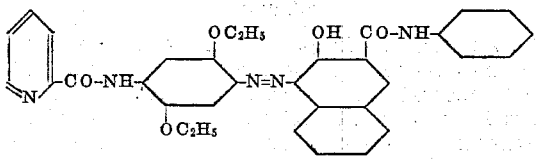

The fastness of the dyeing both to light and to chlorine was superior to that of the dyeing made by coupling diazotized 4-furoylamino-2,5-diethoxy-aniline with N-(2'-hydroxy-3'-naphthoyl)-aniline on cotton and its fastness to chlorine was very much superior to that of the dyeing made by coupling 4-alpha-thienoyl-amino-2,5-diethoxy-aniline with N-(2'-hydroxy-3'-naphthoyl)-aniline on cotton.

EXAMPLE 11

A piece of cotton piece goods was impregnated in the usual manner with N-(2'-hydroxy-3'-naphthoyl)-aniline. A diazo bath containing 100 parts of diazotized 4-iso-nicotinyl-amino-2,5-diethoxy-aniline was prepared in the manner described in Example 10 except that 4-iso-nicotinyl-amino-2,5-diethoxy aniline was used as the amino base instead of 4-picolinylamino-2,5-diethoxy aniline. The dyeing was developed by applying the diazo solution to the impregnated goods. A blue dyeing was produced by the formation of the azo dye represented by the following formula.

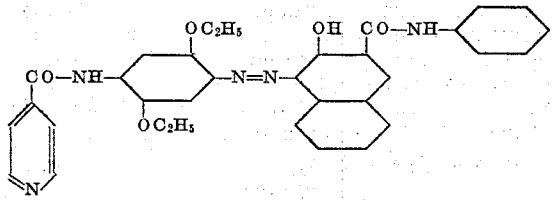

The dye possessed good fastness to light, chlorine, and washing.

EXAMPLE 12

A piece of cotton goods, impregnated in the usual manner with N-(2'-hydroxy-3'-naphthoyl)-o-toluidine, was developed in a diazo bath prepared as described in Example 10 from 4-picolinylamino-2,5-diethoxy-aniline. A bright greenish blue dyeing of very good fastness to light, washing, chlorine and power laundry was obtained. The dye is represented by the formula

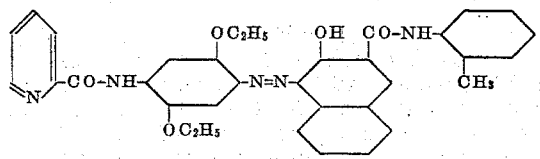

EXAMPLE 13

A piece of cotton goods, impregnated in the usual manner with N-(2'-hydroxy-3'-naphthoyl)-3-nitro-aniline was developed in a diazo bath prepared as described in Example 10 from 4-picolinylamino-2,5-diethoxy-aniline. A violet dyeing of good fastness to light, chlorine and washing was obtained. The dye is represented by the formula

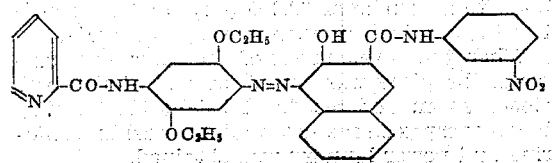

EXAMPLE 14

A piece of cotton goods, impregnated in the usual manner with N-(2'-hydroxy-3'-naphthoyl)-1-amino-naphthalene, was developed in a diazo bath prepared as described in Example 10 from 4-picolinylamino-2,5-diethoxy-aniline. A greenish blue dyeing of good fastness to light, crocking, chlorine and washing was obtained. The dye is represented by the formula

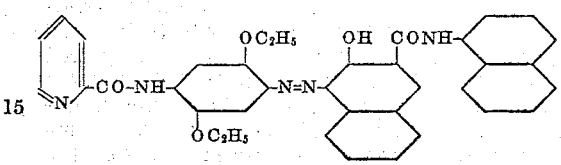

EXAMPLE 15

A piece of cotton goods, impregnated in the usual way with N-(2'-hydroxy-3'-naphthoyl)-p-anisidine, was developed in a diazo bath prepared as described in Example 10 from 4-picolinylamino-2,5-diethoxy-aniline. A navy blue dyeing was obtained which had good fastness to light, chlorine and washing. The dye is represented by the formula

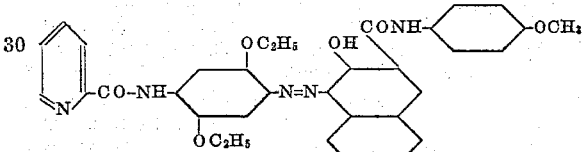

EXAMPLE 16

A piece of cotton goods, impregnated in the usual way with N-(2'-hydroxy-3'-naphthoyl)-2-amino-naphthalene, was developed in a diazo bath prepared as described in Example 10 from 4-picolinylamino-2,5-diethoxy-aniline. A deep blue dyeing was obtained which had good fastness to washing, chlorine and light. The dye is represented by the formula

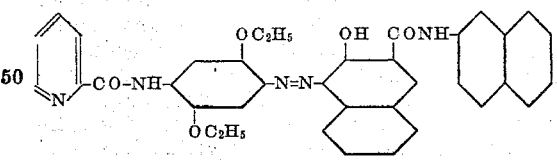

EXAMPLE 17

A diazo solution was prepared by dissolving 161.5 parts of 4-picolinylamino-2,5-diethoxy-aniline in a mixture consisting of 1920 parts of ice water and 311 parts of 22% hydrochloric acid and then slowly adding 124.2 parts of 30% sodium nitrite solution. The diazo solution was clarified and slowly added over a period of 1 hour to a solution containing 91 parts of sodium pipecolinate, 299 parts of sodium carbonate and 2300 parts of water. After the dark colored solution had been allowed to stand for four hours at room temperature, it was filtered to remove a small amount of insoluble impurity. Upon adding two thousand parts of a 30% caustic soda solution, a product separated out in the form of a dark colored viscous layer. The viscous product was removed and dried at 40° to 50° C. under diminished pressure. The dried product consisted of 259 parts of a dark brown solid which was 66.2% pure. This diazoimino compound is represented by the formula

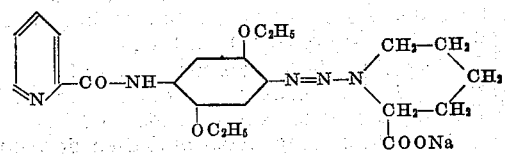

A printing paste was made by mixing

| | Parts |
|---|---|
| The diazoimino compound prepared as described above | 2.8 |
| N-(2'-hydroxy-3'-naphthoyl)-o-toluidine | 1.2 |
| Ethylene glycol-mono-ethyl ether | 4.0 |
| 35% sodium hydroxide solution | 4.0 |
| Water | 18.0 |
| Starch-tragacanth thickener | 70.0 |
| | 100.0 |

A piece of cotton piece goods was printed from an engraved copper roll with the above paste. The printed fabric was placed for four minutes at 100° C. in an atmosphere of saturated steam containing the vapors of acetic and formic acids. The printed pattern developed to a greenish blue dyeing due to the formation on the fiber of the dye of the formula given in Example 12. The printed cloth was then rinsed, soaped, rinsed again, and dried. The printed pattern showed good fastness to washing, chlorine and light.

EXAMPLE 18

A diazo bath was prepared from 85 parts of 2-amino-4-methoxy-5-picolinylamino-toluene, 97 parts hydrochloric acid (32° Tw.), 23.2 parts of sodium nitrite and 346 parts of sodium acetate, using the same temperatures, times and quantities of water as were used in Example 10.

A piece of cotton piece goods, impregnated in the usual way with N-(2'-hydroxy-3'-naphthoyl)-aniline, was developed in this bath and then rinsed, soaped, rinsed again and dried. A red-violet dyeing having good fastness to light, chlorine, washing and crocking was obtained. The dye is represented by the formula

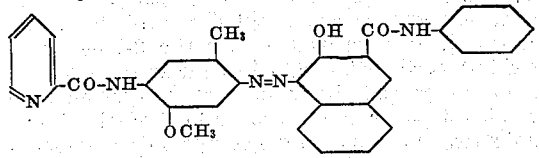

EXAMPLE 19

A piece of cotton piece goods, impregnated in the usual way with N-(2'-hydroxy-3'-naphthoyl)-1-amino-naphthalene, was developed in a diazo bath made by the method described in example 10 from 91 parts of 4-picolinyl-amino-2,5-dimethoxy-aniline by using the same quantities of acid, ice water, nitrite and buffer and the same times and temperatures used in Example 10. A reddish blue dyeing of good fastness to washing, light, chlorine and crocking was obtained. The dye is represented by the formula

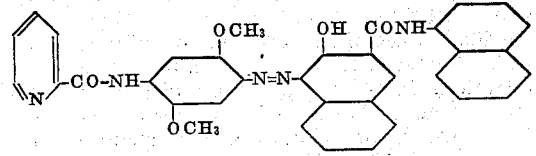

EXAMPLE 20

A solution of N-(2'-hydroxy-3'-naphthoyl)-aniline was prepared by stirring 10 parts of the aniline with 10 parts of ethyl alcohol, adding 5 parts of 32% sodium hydroxide and then diluting with 500 parts of water. An equivalent quantity of diazotized 4-picolinylamino-2,5-diethoxy-aniline, prepared as described in Example 10 was added to the solution of the aniline. An insoluble blue-black pigment was formed. This was filtered off, washed and dried. The pigment was soluble in concentrated sulfuric acid to a blue-green solution.

EXAMPLE 21

A solution of acetoacetyl-p-phenetidine was prepared by stirring 10 parts of this compound with 10 parts of ethyl alcohol, adding 7 parts of 32% sodium hydroxide solution and then diluting with 500 parts of water. An equivalent quantity of diazotized 4-picolinylamino-2,5-diethoxy-aniline, prepared as described in Example 10, was added to the solution of the acetoacetyl-p-phenetidine. An insoluble yellowish-brown pigment was precipitated. It was filtered, washed and dried. The dried product was a dark red-brown powder which was soluble in concentrated sulfuric acid giving a wine-colored solution.

EXAMPLE 22

A piece of cotton piece goods, impregnated in the usual way with N-(2'-hydroxy-3'-naphthoyl)-aniline, was developed in a diazo bath made by the method described in Example 10 from 71 parts of 3-picolinylamino-aniline and by using the same relative quantities of ice water, acid, nitrite and buffer and the same times and temperatures specified in Example 10. A bluish-red dyeing of good general fastness properties, particularly fastness to crocking and rubbing was obtained. The dye is represented by the formula

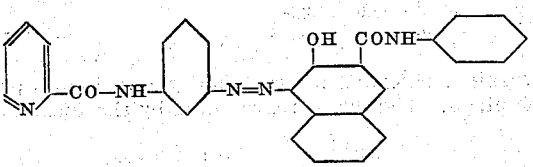

EXAMPLE 23

A piece of cotton piece goods, impregnated in the usual way with N-(2'-hydroxy-3'-naphthoyl)-aniline, was developed in a diazo bath made from 82 parts of 4-picolinylamino-3-chloro-aniline and using the same relative quantities of ice water, acid, nitrite and buffer and the same times and temperatures as those specified in Example 10. A blue-red dyeing of unusually good fastness to crocking, chlorine, washing and light was obtained. The dye is represented by the formula

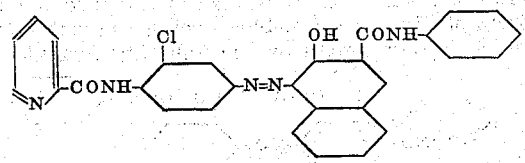

EXAMPLE 24

A piece of cotton piece goods, impregnated in the usual way with N-(2'-hydroxy-3'-naphthoyl)-aniline, was developed in a diazo bath made from 75 parts of 2-picolinylamino-4-amino-toluene by using the same relative quantities of ice water, acid, nitrite and buffer and the same times and temperatures as those specified in Example 10. A red dyeing of good fastness properties, particularly to crocking and light was obtained. The dye is represented by the formula

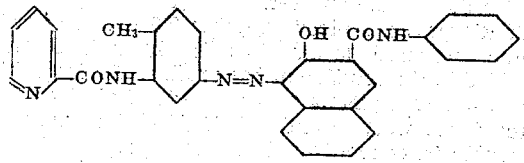

EXAMPLE 25

A piece of cotton piece goods, impregnated in the usual way with N-(2'-hydroxy-3'-naphthoyl)-aniline, was developed in a diazo bath prepared from 81 parts of 2-picolinylamino-5-amino-anisole by using the same relative quantities of ice water, acid, nitrite and buffer and the same times and temperatures as those specified in Example 10. A red-violet dyeing of good fastness to crocking, washing, chlorine, power laundry and light was obtained. The dye is represented by the formula

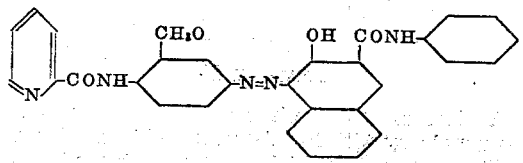

EXAMPLE 26

A piece of cotton piece goods, impregnated in the usual manner with N-(2'-hydroxy-3'-naphthoyl)-aniline, was developed in a diazo bath made up from 100 parts of 4-nicotinylamino-2,5-diethoxy-aniline by using the same number of parts of ice water, acid, nitrite and buffer and the same times and temperatures as those specified in Example 10. A green-blue dyeing was obtained which is represented by the following formula

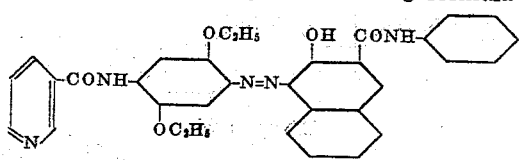

The above dye displayed unusually good dischargeability, good washing and light fastness, and satisfactory fastness to crocking and peroxide bleaching. Its fastness to light was superior to that of the dyestuff made by coupling diazotized 4-furoylamino-2,5-diethoxy-aniline to N-(2'-hydroxy-3'-naphthoyl)-aniline and its dischargeability was superior both to that of the above furoylamino type dyestuff and also to that of the dyestuff made by coupling diazotized 4-alpha-thenoyl-amino-2,5-diethoxy-aniline to N-(2'-hydroxy-3'-naphthoyl)-aniline.

The following are other illustrations of the invention. In these examples dyeings were made by padding pieces of cotton goods with the indicated coupling components and then developing with the indicated diazo components in a manner similar to the methods described in the foregoing examples. The shades of the resulting dyeings are indicated in the column entitled, Shade. As compared to dyeings produced by analogous combinations with similar combinations of 4-furoylamino-anilines and 4-thienoyl-amino-anilines, the combinations shown in the table had better dischargeability, light and chlorine fastness.

| Example | Diazo component | Coupling component | Shade |
|---|---|---|---|
| 27 | 4-picolinylamino-2,5-diethoxy-aniline | N-(2'-hydroxy-3'-naphthoyl)-2,4,5-trimethyl-aniline | Violet. |
| 28 | do | N-(7'-hydroxy-alpha-naphtho-carbazole-6'-carbonyl)-p-anisidine | Navy-blue. |
| 29 | do | Di-acetoacetyl-ortho-tolidine | Yellow-brown. |
| 30 | do | Terephthaloyl-bis-(N-acetyl-5-chloro-2,4-dimethoxy-aniline) | Do. |
| 31 | do | N-(2'-hydroxy-di-benzo-furan-3'-carbonyl)-2,5-dimethoxy-aniline | Brown. |
| 32 | 4-picolinylamino-2,5-dimethoxy-aniline | N-(2'-hydroxy-3'-naphthoyl)-o-phenetidine | Violet. |
| 33 | do | N-(2'-hydroxy-3'-naphthoyl)-2,5-dimethoxy-aniline | Do. |
| 34 | do | N-(2'-hydroxy-3'-naphthoyl)-aniline | Reddish-blue. |
| 35 | do | N-(2'-hydroxy-3'-naphthoyl)-2-amino-naphthalene | Do. |
| 36 | do | N-(2'-hydroxy-3'-naphthoyl)-3-nitro-aniline | Do. |
| 37 | 2-amino-4-methoxy-5-picolinylamino-toluene | N-(2'-hydroxy-3'-naphthoyl)-1-amino-naphthalene | Violet. |
| 38 | do | N-(2'-hydroxy-3'-naphthoyl)-3-nitro-aniline | Do. |
| 39 | do | N-(2'-hydroxy-3'-naphthoyl)-2-amino-naphthalene | Red-violet. |
| 40 | do | N-(2'-hydroxy-3'-naphthoyl)-o-phenetidine | Garnet. |
| 41 | do | N-(2'-hydroxy-3'-naphthoyl)-2,5-dimethoxy-aniline | Corinth. |
| 42 | 2-picolinylamino-4-amino-toluene | N-(2'-hydroxy-3'-naphthoyl)-4-chloro-2-methyl-aniline | Bright red. |
| 43 | do | N-(2'-hydroxy-3'-naphthoyl)-2,4-dimethyl-aniline | Scarlet. |
| 44 | do | N-(2'-hydroxy-3'-naphthoyl)-o-toluidine | Red. |
| 45 | 3-picolinylamino-aniline | N-(2'-hydroxy-3'-naphthoyl)-o-phenetidine | Scarlet. |
| 46 | do | N-(2'-hydroxy-3'-naphthoyl)-2-amino-naphthalene | Red. |
| 47 | do | N-(2'-hydroxy-3'-naphthoyl)-2,4,5-tri-methyl-aniline | Bright red. |
| 48 | 4-picolinylamino-2,5-diethoxy-aniline | N-(2'-hydroxy-anthracene-3'-carbonyl)-o-toluidine | Blue-green. |
| 49 | 2-picolinylamino-5-amino-anisole | Di-acetoacetyl-ortho-tolidine | Bright yellow. |
| 50 | 4-picolinylamino-3-chloro-aniline | N-(2'-hydroxy-3'-naphthoyl)-o-anisidine | Bluish red. |
| 51 | do | N-(2'-hydroxy-3'-naphthoyl)-2,5-dimethoxy-aniline | Do. |
| 52 | 3-picolinylamino-aniline | do | Reddish orange. |
| 53 | do | N-(2'-hydroxy-3'-naphthoyl)-o-phenetidine | Do. |

Any of the indicated combinations can be coupled in substance to produce pigments having shades which are somewhat similar to the developed dyeings and any of the combinations can be applied to textile fabrics by padding or by printing processes as indicated hereinbefore. By the methods described, either the 2-, 3- or 4-pyridine carboxylic acid can be used to make the amino bases and either acid can be reacted with any 3-nitro- or a 4-nitro-aniline of the kinds indicated to produce nitro compounds represented by the general formula

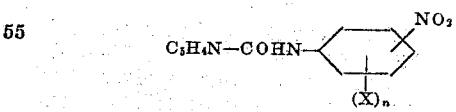

wherein X is from the group consisting of hydrogen, alkyl having 1 to 3 carbons, the corresponding alkoxy groups, phenyl, phenoxy, chloro and bromo; and $n$ is an integer not greater than 2. All of these nitro compounds can then be reduced to form the corresponding primary arylamines which are used as amino bases in making the dyes.

As illustrative of the many nitro-anilines which can be reacted with the picolinic, nicotinic or isonicotinic acid to produce such nitro-pyridinyl-amino compounds of the benzene series in addition to those shown in foregoing examples are mentioned 2-nitro-4-amino-5-chloro-toluene, 3-bromo-4-nitroaniline, 2-amino-5-nitro-diphenyl-ether, 4-nitro-2,5-di-iso-propoxy aniline, 2-nitro-4-amino-5-n-propoxy toluene, 2-nitro-4- amino-ethylbenzene, 2-amino-5-nitro-1,4-xylene, 2-amino-4-isopropyl-5-nitro anisole, 2-chloro-3-nitro-6-amino toluene. Any of the resulting nitro-pyridinylamino compounds of the benzene series may be readily reduced to the analogous primary amines by suitable reduction methods, such as those described in the foregoing examples. In the reductions with nickel catalyst, any nickel hydrogenation catalyst can be used. The temperature and pressure of hydrogenation may be considerably varied. Temperatures of about 50° to about 200° C. and pressures of about 200 to about 1000 pounds gauge are suitable. More or less inert solvent can be used besides the proportions enumerated. Specific illustrations and other inert solvents besides toluene or methyl alcohol can be used. By inert organic solvent is meant any organic solvent in which the nitro substituted compound to be treated is soluble to an appreciable extent, which does not hydrogenate in the conditions used to reduce the nitro group and which does not react with the final product except as a solvent. Calcium carbonate is not an essential constituent of the reduction medium.

As illustrative of other primary arylamines of the pyridine-carbonyl-amino compounds of the benzene series which can be used as amino bases to produce azo combinations having properties similar to those described are mentioned 3-bromo-4-picolinylamino-aniline, 3-nitro-4-picolinylamino-aniline, 5-amino-2-picolinylamino-diphenyl-ether, 4-picolinylamino-2,5-di-n-propoxy-aniline, 4-amino-6-picolinylamino-1,3-xylene, 2-amino-5-picolinylamino-4-iso-propyl-toluene and 2-amino-4-chloro-5-picolinyl-amino-toluene.

Any ice color coupling component which is devoid of solubilizing groups, such as carboxyl and sulfonic acid can be used as the coupling component to make the dyes of the invention, such as the arylamides of ortho hydroxy aryl carboxylic acids, phenolic coupling components and the arylamides of beta-keto carboxylic acids. As illustrations of ice color coupling components are mentioned the arylamides of 2-hydroxy-3-naphthoic acid, 2-hydroxy-carbazole-3-carboxylic acid, 2-hydroxy-diphenylene-oxide-3-carboxylic acid, 2-hydroxy-anthracene-3-carboxylic acid, 7-hydroxy-alpha-naphthocarbazole-6-carboxylic acid, terephthaloyl-bis-acetic acid, aceto-acetic acid and benzoyl-acetic acid in which the arylamide groups are the residues of aniline, the toluidines, the xylidines, alkoxy- and aryloxy-anilines, halo and nitro-anilines, halogenated toluidines, halogenated xylidines, halogenated alkoxy- and aryloxy-anilines, dianisidine, tolidine, alpha- and beta-naphthylamine. Other such components are alpha- and beta-naphthol and derivatives thereof, such as those which are substituted in the 5-, 6-, 7- or 8-positions by bromine, chlorine, amino, alkyl and alkoxy containing 1 to 6 carbons.

The developed dyeings, such as dyeings on textile fibers are made in accordance with the invention by impregnating the material to be dyed with the coupling component, as by applying a suitable solution of the coupling component whereby the coupling component is affixedly held by the fiber and then applying a diazo solution from one of the new amino bases to attain development; by impregnating with the coupling component, printing with a printing paste containing a diazo salt of the arylamine or by converting the diazotized arylamine to a derivative thereof which is stable and non-reactive toward the coupling component in alkaline medium, applying to the material to be dyed an alkaline composition containing the diazo derivative and the coupling component, such as a printing paste and then acidifying to effect development.

The new dyes are represented by the formula

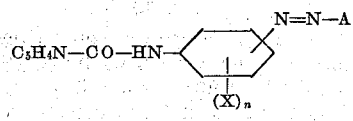

wherein $C_5H_4N-CO-$ is the residue of the group consisting of a 2-, 3- or 4-pyridine carboxylic acid; the nucleus

is the residue of a diamine in which X is from a group consisting of hydrogen, alkyl having 1 to 3 carbons, the corresponding alkoxy groups, phenyl, phenoxy, and halogen. The new dyes produce dyeings on suitable dyeable fibers in a variety of shades of yellows, blues and reds which have unusually good dischargeability, fastness to chlorine and fastness to light. Other fastness properties commonly required in satisfactory dyeings are good. The dischargeability, fastness to chlorine and fastness to light of the dyeings made in accordance with the invention are far superior to dyes of similar structure which differ from the new dyes in that the diazo component is an amino-furoylamino- or an thenoylamino compound of the benzene series.

The preferred class of arylamines are pyridine-carbonyl-amides of the formula

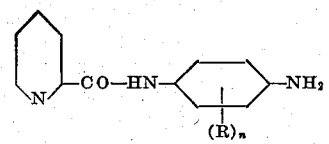

and especially those wherein R is from the group consisting of hydrogen, methyl, methoxy, ethoxy and chloro. The dyes made by diazotizing the amides of this class and coupling with an arylide of 2,3-hydroxy-naphthoic acid have the best general properties together with the improvement in dischargeability, chlorine fastness and light fastness.

From the foregoing disclosure it will be recognized that the invention is susceptible of modification without departing from the spirit and scope thereof and it is to be understood that the invention is not restricted to the specific illustrations thereof herein set forth.

I claim:

1. An insoluble azo dye represented by the formula

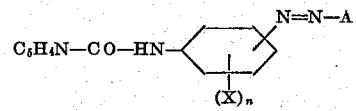

in which $C_5H_4N-CO-$ is a residue of a pyridine carboxylic acid; X is from a group consisting of hydrogen, alkyl having 1 to 3 carbons, the corresponding alkoxy groups, phenyl, phenoxy and halogen; $n$ is 1 to 2; and A represents the residue of an ice color coupling component.

2. An insoluble azo dye represented by the formula

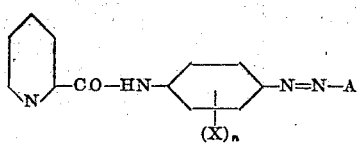

wherein X is from a group consisting of hydrogen, alkyl having 1 to 3 carbons, the corresponding alkoxy groups, phenyl, phenoxy and halogen; $n$ is 1 to 2; and A represents the residue of an ice color coupling component.

3. An insoluble azo dye represented by the formula

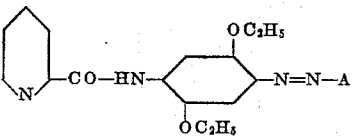

wherein A represents the residue of an arylide of 2,3-hydroxy-naphthoic acid.

4. An insoluble azo dye represented by the formula

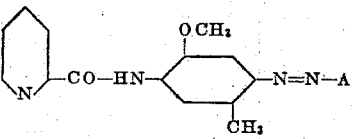

wherein A represents the residue of an arylide of 2,3-hydroxy-naphthoic acid.

5. An insoluble azo dye represented by the formula

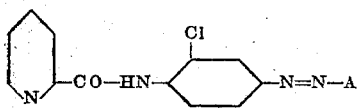

wherein A represents the residue of an arylide of 2,3-hydroxy-naphthoic acid.

6. Textile fiber dyed with a dye of claim 1.

7. The process which comprises diazotizing a primary amine represented by the formula

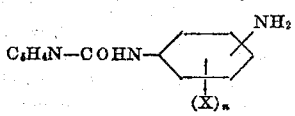

wherein $C_5H_4N-$ is the residue of pyridine; X is from a group consisting of hydrogen, alkyl having 1 to 3 carbons, the corresponding alkoxy groups, phenyl phenoxy and halogen and $n$ is an integer not greater than 2; and coupling with an ice color coupling component.

8. The process in accordance with claim 7 wherein the pyridine-carbonyl-amino group is picolinylamino and the primary amino group is para thereto.

9. The process in accordance with claim 7 wherein the pyridine-carbonyl-amino group is picolinylamino, the primary amino group is para thereto, and the coupling component is an arylide of 2-3-hydroxy-naphthoic acid.

PETER F. GROSS.

Certificate of Correction

Patent No. 2,365,265.  December 19, 1944.

PETER F. GROSS

It is hereby certified that errors appear in the printed specification of the above numbered patent requiring correction as follows: Page 1, first column, line 8, for "$C_5H_4$—" read $C_5H_4N$—; page 5, first column, lines 3 to 9 inclusive, for that portion of the formula reading

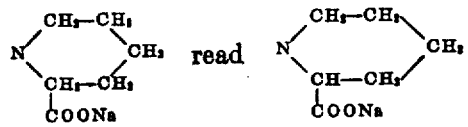

and that the said Letters Patent should be read with these corrections therein that the same may conform to the record of the case in the Patent Office.

Signed and sealed this 15th day of May, A. D. 1945.

[SEAL]

LESLIE FRAZER,
*Acting Commissioner of Patents.*